Figure 1:
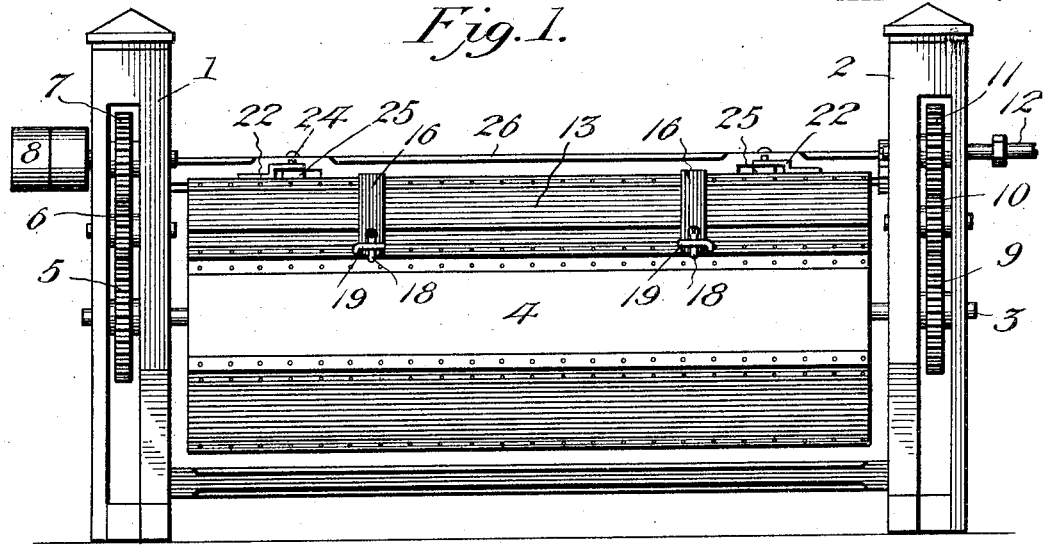

No. 779,010. PATENTED JAN. 3, 1905.
L. ST. JEAN.
DOUGH MIXING MACHINE.
APPLICATION FILED JULY 29, 1904.

3 SHEETS—SHEET 1.

Witnesses
Edwin G. McKee
K. Allen

Inventor
Louis St. Jean,
By Victor J. Evans
Attorney

No. 779,010. PATENTED JAN. 3, 1905.
L. ST. JEAN.
DOUGH MIXING MACHINE.
APPLICATION FILED JULY 29, 1904.

3 SHEETS—SHEET 2.

Witnesses
Edwin G. McKee
H. C. Allen

Inventor
Louis St. Jean,
By Victor J. Evans
Attorney

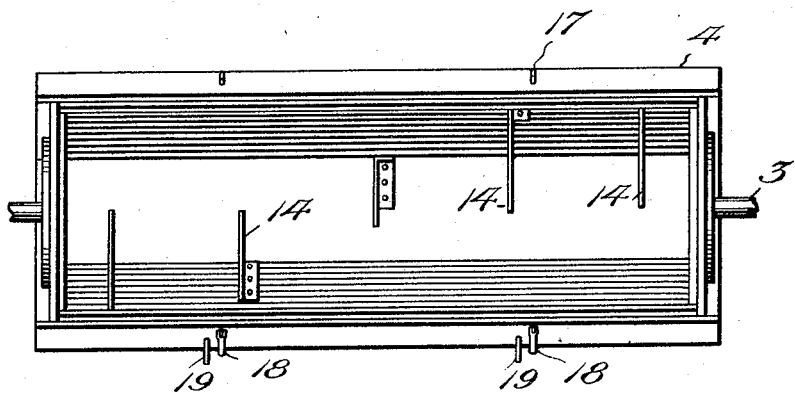
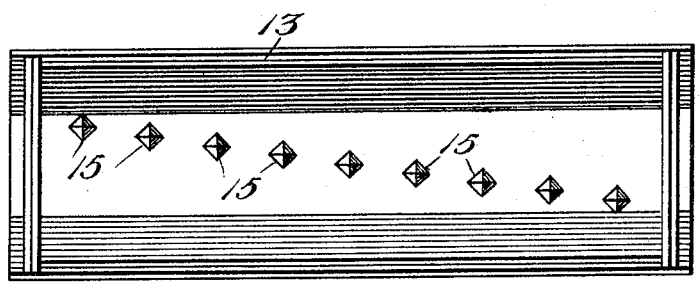
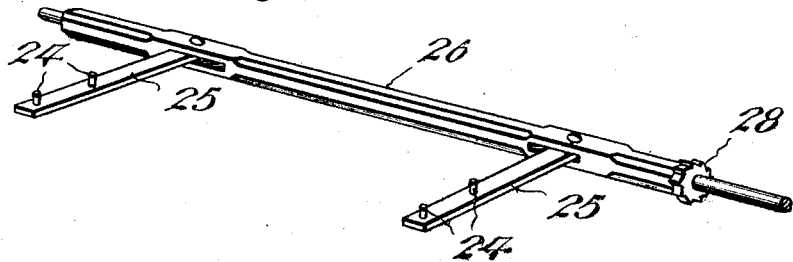

No. 779,010. Patented January 3, 1905.

UNITED STATES PATENT OFFICE.

LOUIS ST. JEAN, OF CHICAGO, ILLINOIS.

DOUGH-MIXING MACHINE.

SPECIFICATION forming part of Letters Patent No. 779,010, dated January 3, 1905.

Application filed July 29, 1904. Serial No. 218,714.

*To all whom it may concern:*

Be it known that I, LOUIS ST. JEAN, a citizen of the United States, residing at Chicago, in the county of Cook and State of Illinois, have invented new and useful Improvements in Dough-Mixing Machines, of which the following is a specification.

This invention relates to dough-mixing machines, such as are designed particularly for use in bakeries and the like where it is necessary to mix large quantities of dough.

In machines of the character indicated as heretofore constructed great difficulty has been experienced in removing the mixed dough from the machine. One object of the present invention, therefore, is to improve the construction of dough-mixing machines in such manner as to facilitate the operation of removing therefrom the mixed dough.

A further objection to dough-mixing machines as generally constructed is that they fail thoroughly and quickly to mix the dough. For this reason a second object of the present invention is to improve the interior construction of the mixing-receptacle in such manner as to secure a thorough and rapid mixing of the dough.

A third objection to prior forms of dough-mixing machines is that the closing means of the receptacle in which the dough is mixed frequently proves ineffective, whereby the dough is caused to leak or exude at the joint between the cover and the receptacle proper. Therefore the third object of the invention is to improve the means for locking the cover upon the receptacle in such manner that the possibility of dough exuding at the joint will be avoided.

The first object of the invention is attained, preferably, by providing a removable cover for the dough-mixing receptacle and by mounting in the frame of the machine a supplemental shaft having members adapted to engage the removable cover, whereby when the cover has been unlocked from the receptacle and the supplemental shaft rotated said cover will be removed entirely from the receptacle and elevated thereabove, after which by turning the receptacle upon its journal-bearings the mixed dough will drop therefrom by gravity into any suitable receiving-receptacle placed beneath the machine.

The second object of the invention is attained, preferably, by providing the dough-mixing receptacle interiorly with a plurality of blades and by placing upon the removable cover thereof a plurality of spikes, the blades and spikes being arranged in spiral position with respect to each other.

The third object of the invention is attained, preferably, by employing a plurality of removable straps for holding the cover in position upon the receptacle and by providing improved locking devices for the straps which will first exert a stretching or tightening action upon the straps and then lock them securely in position, whereby suitable gaskets disposed between the cover and the receptacle will be compressed to prevent the leakage of dough.

Figure 2:
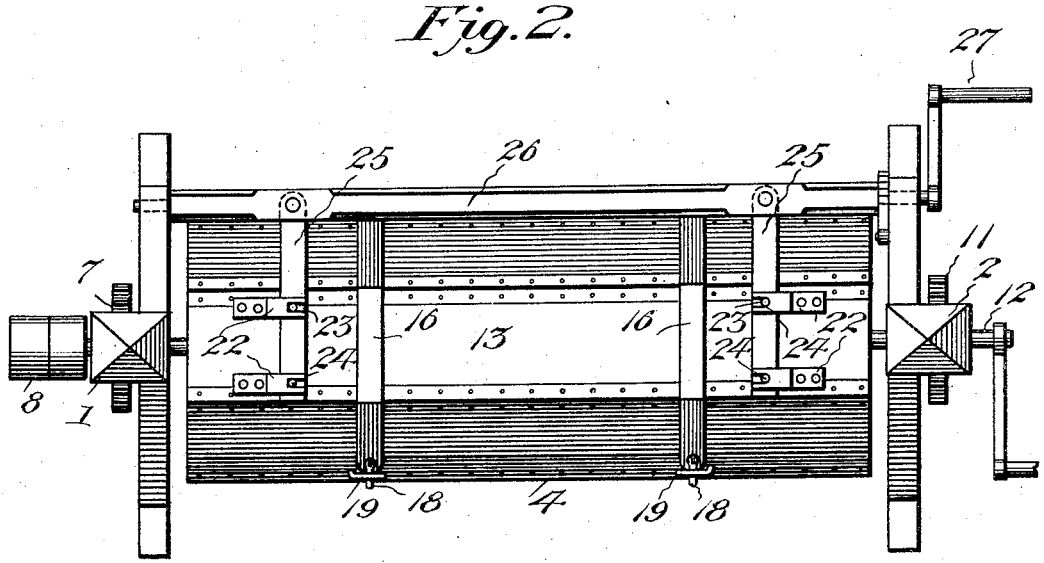
Figure 3:
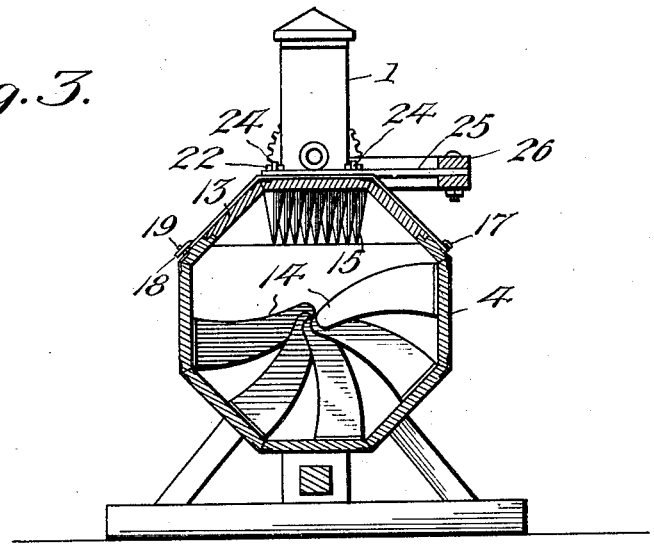
Figure 4:
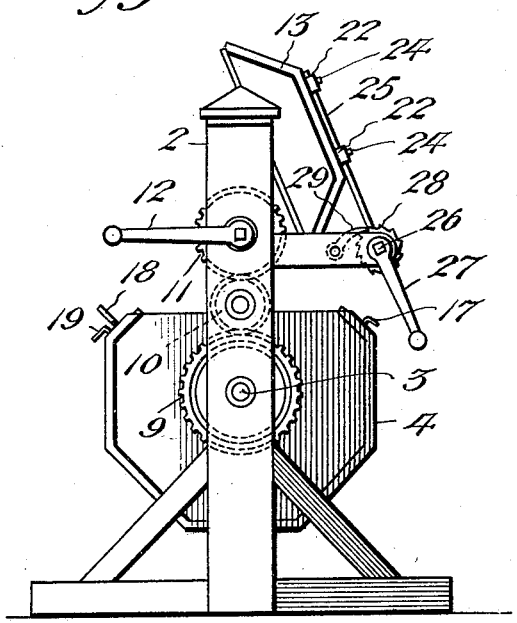
Figure 8:
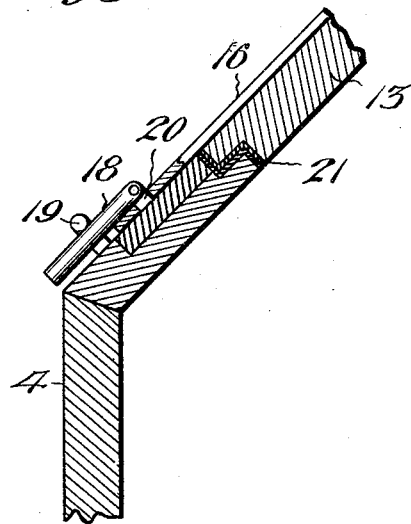

In the accompanying drawings, forming part of this specification, Figure 1 is a side elevation of a dough-mixing machine constructed in accordance with the invention. Fig. 2 is a plan view thereof. Fig. 3 is a transverse vertical section. Fig. 4 is an end elevation. Fig. 5 is a plan view of the dough-mixing receptacle with the cover thereof removed. Fig. 6 is an under plan view of the cover, showing the arrangement of the pyramidal spikes. Fig. 7 is a perspective view of the supplemental shaft with its pivot members adapted for removing, holding, and replacing the cover of the dough-mixing receptacle. Fig. 8 is a transverse section through part of the dough-mixing receptacle and cover, showing the position of the gasket and locking devices when the cover is closed.

Like reference-numerals indicate corresponding parts in the different views.

The reference-numerals 1 2 indicate the uprights of any suitable form of frame, in which the shaft 3 of the octagonal dough-mixing receptacle 4 is journaled. The shaft 3 of the rotary dough-mixing receptacle is provided at one end with a gear-wheel 5, in mesh with a train of gear-wheels 6 7, which are rotated by a suitable belt-wheel 8 when the machine is operated by steam or other suitable motor-power. At its opposite end the shaft 3 is provided with a gear-wheel 9, meshing with suitable gear-wheels 10 and 11, operated by means of a crank 12 when hand-power is used to rotate the dough-mixing receptacle.

Although it will be understood that the invention is not to be limited to the use of an octagonal dough-mixing receptacle, still it is preferred that such form of receptacle be used and that a bodily-removable cover 13 be used in connection with the receptacle. Interiorly the receptacle is provided with a plurality of blades 14, which are spaced apart longitudinally and arranged in spiral position with respect to each other, as shown in Fig. 5, one of the blades being placed, preferably, upon each of the flat faces of the receptacle. Disposed upon the under surface of the removable cover 13 is a plurality of downwardly-depending or interiorly-projecting spikes 15, which preferably are pyramidal in shape and are arranged in spiral position with respect to each other, as shown in Fig. 6.

The removable cover 13 is held in position upon the dough-mixing receptacle preferably by using straps, such as 16, Fig. 2, which may be either flexible in their nature or else composed of metallic sections hinged to each other. One end of each strap is perforated to engage a hook-bracket, such as 17, Fig. 4, and the other end is perforated to receive a locking device, such as 18, which comprises a pivoted latch adapted to be held in locked position by means of a swinging pivot member or retaining device 19. After the cover 13 has been placed upon the dough-mixing receptacle the straps 16 are engaged with the hook-brackets 17. The locking devices or pivot members 18 are then passed through the perforations, such as 20, in the opposite ends of the straps. By forcing the locking devices flat down against the receptacle the straps 18 are first stretched sufficiently to compress the gaskets or packing 21, disposed upon the shouldered joint between the cover and receptacle, and then locked securely in position by turning the retaining device 19 upon its pivot until it rests across the locking device 18, as shown clearly in Figs. 1 and 8.

Disposed upon the upper surface of the removable cover 13 is a plurality of brackets, such as 22, each of which is slotted, as shown at 23, to receive a pin or projection 24 upon an arm or swinging member 25, pivoted upon a supplemental shaft 26, journaled in the machine-frame. The supplemental shaft 26 is adapted to be rotated by means of a crank 27 and is provided with a ratchet-wheel 28, with which coöperates a pivoted pawl 29, Fig. 4. It will be understood that the pivot members 25 upon the supplemental shaft 26 are adapted to be swung into and out of engagement with the slotted brackets 22 upon the removable cover 13. When it is desired to remove the contents of the dough-making receptacle, the straps 16 are removed and the pivot members 25 of the supplemental shaft 26 are swung into engagement with the slotted brackets 22, after which it is necessary only to rotate the crank 27 in order bodily to lift the cover 13 from the dough-mixing receptacle, as shown in Fig. 4, the pivoted pawl 29 serving to hold the cover in raised position and the pins 23 upon the pivot members 25 by engaging the slots in the brackets serving to prevent the cover from slipping longitudinally upon the pivot members 25. After the cover 13 has been raised to the position shown in Fig. 4 it is necessary only to rotate the dough-mixing receptacle until it is disposed upside down, thus permitting the contents thereof to fall by gravity into any suitable receiving-receptacle (not shown) disposed thereunder.

It has been found in practice that the form of blades illustrated and described, in combination with the pyramidal spikes upon the removable cover, serve effectively and quickly to mix the dough contained in the rotary receptacle 4.

Changes in the precise embodiment of invention illustrated and described may be made within the scope of the following claims without departing from the spirit of the invention or sacrificing any of its advantages.

It has been found in practice that by using a wooden dough-mixing receptacle the dough is induced to rise without the necessity of removing it to another receptacle and subjecting it to the action of heating. The present invention therefore contemplates the use of a wooden receptacle for the purpose specified.

Having thus described the invention, what is claimed is—

1. A dough-mixing machine comprising a rotary receptacle having a removable cover, and mechanism for removing, holding and replacing the cover.

2. A dough-mixing machine comprising a frame, a rotary receptacle therein, a removable cover upon the receptacle, slotted brackets upon the cover, a supplemental shaft, and pivot members upon the supplemental shaft having pins to engage the slotted brackets and remove the cover from the receptacle.

3. A dough-mixing machine having a rotary receptacle, a removable cover upon the receptacle, engaging means upon the cover, a supplemental shaft, and means upon the supplemental shaft to coöperate with the engaging means upon the cover and to remove, hold and replace the cover of the receptacle.

4. A dough-mixing machine comprising a rotary receptacle, a removable cover upon the receptacle, hook-brackets upon one side of the receptacle, locking and retaining devices upon the opposite side thereof, and straps engaged with the hook-brackets on one side and with the locking devices upon the other, said straps holding the cover in position.

5. A dough-mixing machine comprising a frame, a rotary receptacle therein, a removable cover upon the receptacle, removable means holding the cover in place, slotted brackets upon the cover, a supplementary shaft in the frame, a ratchet-wheel upon the shaft, a pivoted pawl coöperating with the ratchet-wheel, and pivot members upon the supplementary shaft, said pivot members having pins adapted to engage the slotted brackets of the cover, and being adapted to raise said cover from the rotary receptacle.

In testimony whereof I affix my signature in presence of two witnesses.

LOUIS ST. JEAN.

Witnesses:
PETER BENJ. KENNEDY,
EUGENE LAPOURTE.